United States Patent Office 3,315,377
Patented Apr. 25, 1967

3,315,377
TEST SCORING MACHINE
Peter Frederic Thomas Cryer Stillwell, Aldershot, and Peter James Greaves, Harrow, England, assignors, by mesne assignments, to The Rank Organisation Limited, London, England, a British company
Filed Jan. 28, 1965, Ser. No. 428,626
Claims priority, application Great Britain, Jan. 28, 1964, 2,990/64
4 Claims. (Cl. 35—48)

This invention is concerned with improvements in or relating to computers for marking examination papers automatically.

It is common in elementary examinations and even in some more advanced examinations to set multiple choice questions. These are questions where the student is required to select the most appropriate answer of a number offered in the paper. The marking of such papers can be tedious and lengthy since there may be a number of "scoring" selections, and no single unique answer. The purpose of this invention is to provide a computer whereby the paper may be automatically marked.

According to the present invention there is provided a computer for automatically working an examination paper, comprising means for sensing answers made on said paper, means for comparing said answers with a predetermined set of known answers, means according to predetermined instructions, and means for computing the total marks scored for the paper, while detecting and rejecting spoiled papers.

Preferably means are also provided to imprint the total marks scored on the examination paper.

In order to make the invention clearly understood, reference will now be made to the accompanying drawings which are given by way of example and in which.

Figure 1:
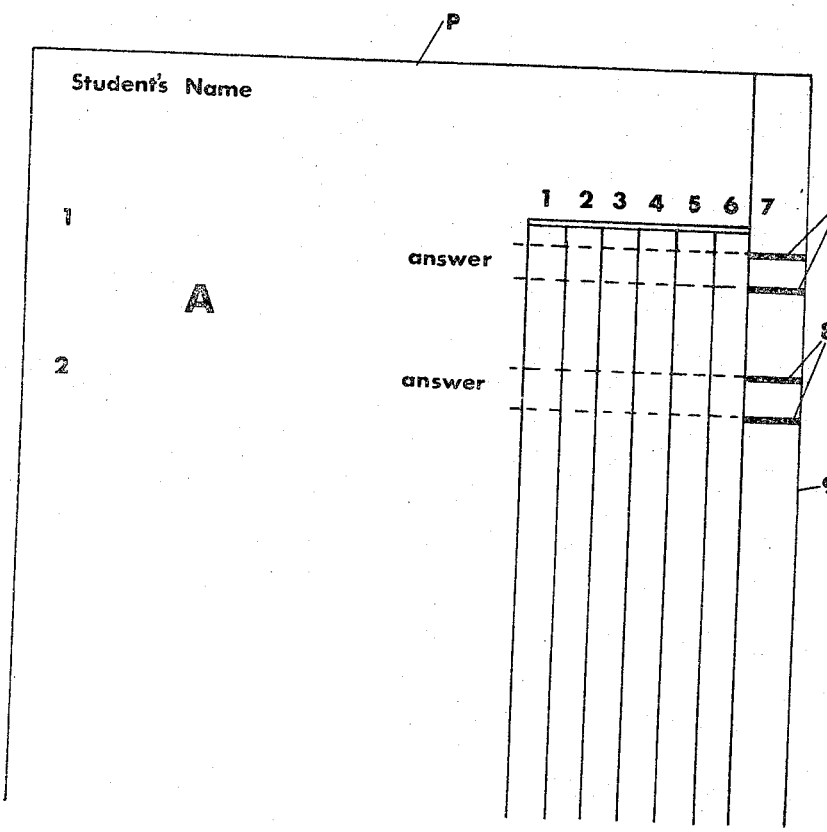
FIGURE 1 is a representation, in outline, of a format for an examination paper.

In the drawings a circle with a symbol 1 inside of it represents an OR gate, a circle with a symbol 2 inside of it represents a two input AND gate, and a circle with a symbol 3 inside of it represents a three input AND gate.

Referring to FIGURE 1 of the drawings, questions to be answered are written in the left hand region A of the paper P, and on the right hand side of the paper are seven columns 1 to 7. Columns 1 to 6 are for the student's use and column 7 contains pre-printed marks 8. When the paper P is to be marked it is passed, guided by its right hand edge 9, under a set of reading heads. These heads may for example be photocells which sense the marks in the various columns 1 to 7. The marks in the column 7 serve to identify the question (by counting) and are placed to "bracket" the answering positions in columns 1 to 6 so that it is possible to observe the outputs 10 of the photocells in these positions only for the period whilst the answer positions lie under the photocells 10. In this way any blemishes occurring between the spaces allocated to answers can be arranged to be ignored.

In the paper the student is, in a single choice question, asked to insert a firm horizontal stroke in the position of his choice. There may be questions, of course, where a number of choices must be made—such as a question which calls for the selection of a number of things into one or more groups in which case the student is asked to fill in with a firm stroke the appropriate spaces in columns 1 to 6.

In the paper shown in FIGURE 1, marks in column 7 denote the position of the answer marks so that supposing the paper P passes head foremost through the reading machine the first mark 8 sensed in column 7 will signal that the answers to the first question are about to pass under the sensing heads. The columns are sensed in parallel and the sensed indications are stored in registers so that when the second mark 8 is sensed in column 7 the column positions marked in the "answer" columns 1 to 6 are electrically or mechanically stored. When the second mark 8 in the column 7 is reached, the outputs 10 from the sensing heads may be disconnected and the contents of the register stores compared with the correct answer. The logic of a single answer comparison is obvious. If coincidence exists between the contents of the register and the answer stored for question 1, marks are given, and these can be arranged to vary according to the value pre-assigned to the question. The "marks" consist of electrical impulses which are totalised by a counter. This process continues throughout the paper until finally the counter contains the total value for the paper. The contents of the counter are arranged to energise an imprinter so that as the paper passes out through the computer the final mark is imprinted thereon.

Figure 2:
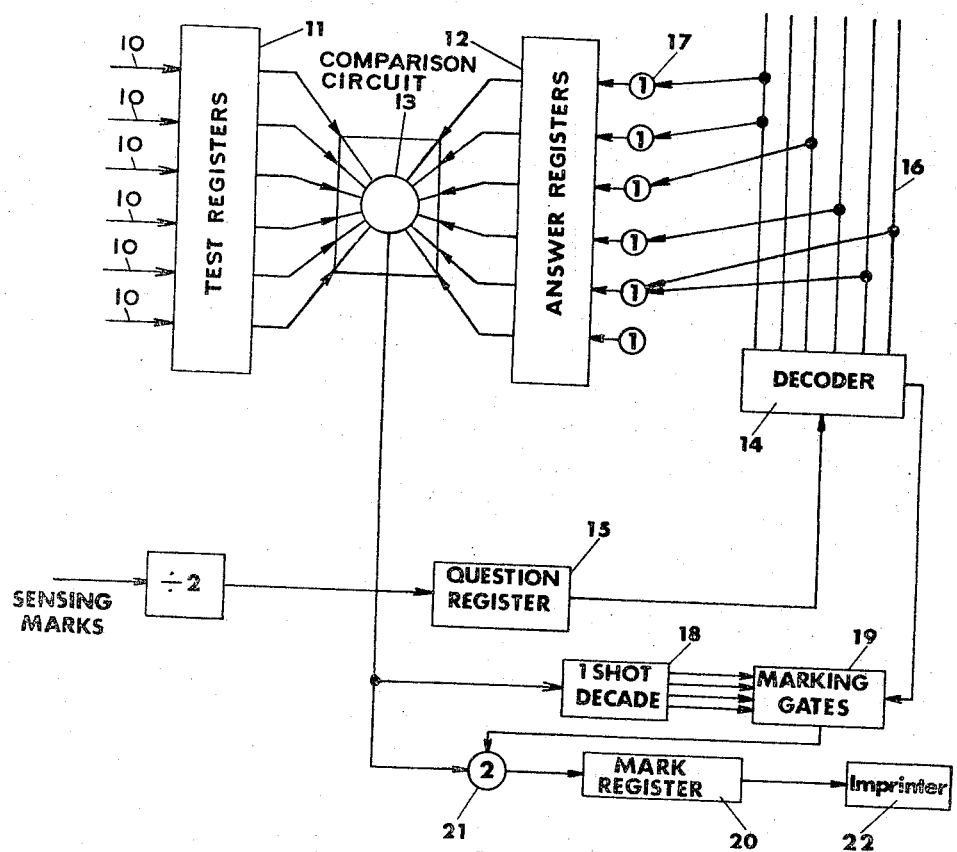
FIGURE 2 is a representation, in schematic form, of a single-answer logic for a computer.

Referring to FIGURE 2, which shows a schematic arrangement for a single-answer logic, the output pulses at the outputs 10 from the photocells are stored in registers 11 which are compared in a comparison circuit 13 with answer registers 12. The answer registers 12 are switched to hold the correct answer to a question by means of a decoder 14 which decodes a question register 15. The question register 15 receives a pulse each time a sensing mark 8 is sensed by an appropriate sensing mechanism, such as a photocell. Each time the two sensing marks of a question occur question register 15 provides a signal to the decoder 14. The decoder 14 then energizes lines 16 with the appropriate "answer" to that question. The wires 16 are connected through OR gates 17 to the answer registers 12 manually. This manual connection enables any sequence of answers to be set up.

If the inputs from the photocells and the contents of the answer registers 12 are identical then an output is obtained which triggers a one-shot decade 18. This could for instance be a circuit which generates numbers of pulses between 1 and 10 on ten separate wires. These output wires are selectively gated by a gate 19 with the answer wires from the question decoder 14 into a mark register 20 by means of an AND gate 21. The mark register drives an imprinter 22. The imprinter 22 is arranged to imprint the final total marks on the paper as it emerges from the reading machine.

The arrangement of FIGURE 2, can be set up to check any single answer paper and to allocate any number of "marks" between 1 and 10 to any question. It cannot, however, mark papers where there are multiple answers.

Figure 3:
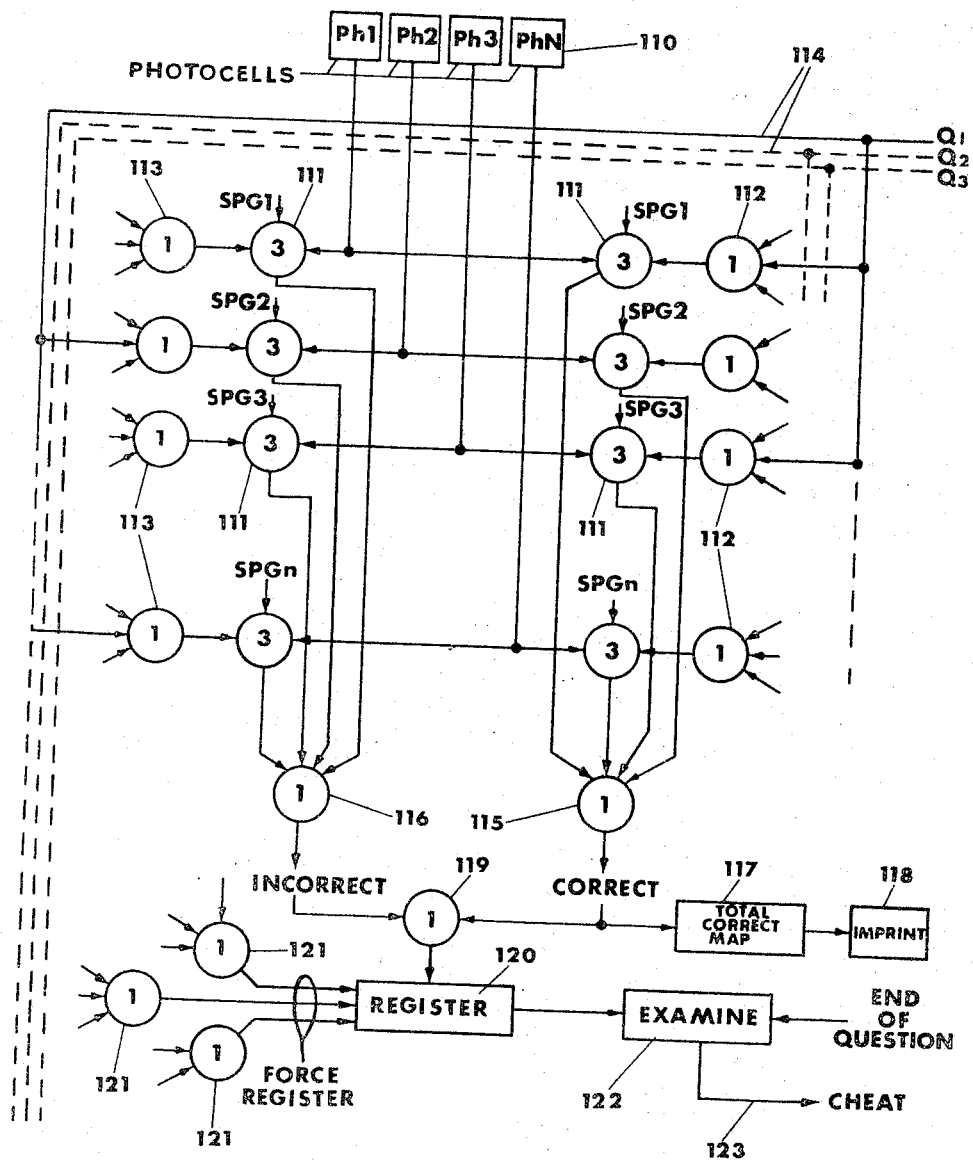
FIGURE 3 is a representation, in schematic form, of a further form of logic for the computer.

FIGURE 3, shows a logic capable of achieving this. The answers from the photocells 110 are applied to AND gates 111 and the correct answers are set up in the machine by connecting the answer wires 114, derived from a decoder as illustrated in FIGURE 2, to two sets of OR gates 112 and 113, OR gates 112 defining correct answers and OR gates 113 defining incorrect answers. That is, for each question the correct answers (of which there may be more than one) are connected to corresponding OR gates 112 and the remainder of the answers (incorrect answers) are connected to corresponding OR gates 113. For example, in FIG. 3 the correct answers for question 1 are the first and third column; hence, an input from line $Q_1$ of lines 114 is applied to the first and third of the OR gates 112. The remaining answers are incorrect; hence, line $Q_1$ is also connected to all of the OR gates 113 except the first and third.

The AND gates 111 are then stroked by a sequential pulse generator (not shown) so that out of two separate OR gates 115 and 116 come pulses corresponding to correct answers and pulses corresponding to incorrect answers. The correct pulses may be used to score marks, the number of correct pulses being counted in a counter 117 and printed on the paper by means of an imprinter 118. The total sum of correct and incorrect pulses can be supplied through a OR gate 119 to a register 120 which is controlled by further OR gates 121 in such a way that it is set by the question wires to the correct number of answers. If the number of correct and incorrect marks on the paper is greater than the proper number of answers this comparison, effected in a examine comparator 122 can be used to provide a 'cheat' output 123. The output 123 can be used to drive a special imprinter to draw attention to the paper or to reject it for manual correction.

This logic will enable a multiple choice paper to be checked by machine. Marks will be given for correct answers and the paper is checked to ensure that a larger number of choices than allowed has not been made. Obvious modifications may be made to enable marks to be subtracted for incorrect answers.

What we claim is:
1. Apparatus for scoring examination papers having a plurality of parallel columns of indicating marks, the presence or absence of said marks representing answers to examination questions and a separate column of marks parallel to said plurality of parallel columns representing the location of marks in the plurality of parallel columns, said apparatus comprising:

means for reading said marks in said plurality of parallel columns;

test register means, responsive to said means for reading said marks in said plurality of parallel columns, for storing electrical signals representing the presence or absence of said marks in accordance with their occurence in a column of said plurality of columns;

means for reading marks in said separate column;

question register means, responsive to said means for reading marks in said separate column, for generating an output signal representative of the number of marks read by said means for reading marks in said separate columns;

decoder means having a plurality of outputs connected to the output of said question register means for decoding the output signal of said question register means and for energizing said decoder outputs in accordance with said output signal;

answer register means connected to the outputs of said decoder means for storing electrical signals representing the energized outputs of said decoder means;

comparison means connected to the outputs of said test register means and said answer register means for comparing the outputs of said test register means and said answer register means and for generating an output signal when the outputs from said test register means and said answer register means compare in a predetermined manner; and means connected to the output of said comparison means for accumulating the output signals from said comparison means and for generating an output signal upon the completion of scoring all of the examination questions.

2. Apparatus as claimed in claim 1 including:

one-shot decade means connected to the output of said comparison means for generating a plurality of pulse output signals each time said comparison means generates an output;

marking gate means connected to the output of said one-shot decade means and having a further input connected to said decoder means for controlling the passing signals from said one-shot decoder means;

AND gate means having two inputs, one input connected to the output of said comparison means and a second input connected to the output of said marking gate means;

mark register means connected to the output of said AND gate means for accumulating the output pulses from said one-shot decade means passed by said marking gate means; and imprinter means connected to the output of said mark register means for imprinting a total accumulation of signals accumulated by said mark register means upon the completion of scoring an examination paper.

3. Apparatus as claimed in claim 1 wherein said comparison means comprises:

a first plurality of correct answer OR gates;

a second plurality of wrong answer OR gates;

a predetermined number of the outputs from said decoder means connected to a predetermined number of said correct answer OR gates, the remaining outputs from said decoder means connected to said wrong answer OR gates, so that correct answer signals are applied to correct answer OR gates and wrong answer signals are applied to wrong answer OR gates;

a first plurality of three input AND gates equal in number to said first plurality of OR gates;

a second plurality of three input AND gates equal in number to said second plurality of OR gates;

the first input of each of said first plurality of AND gates connected to the output of said first plurality of OR gates, and the second input to each of said plurality of AND gates adapted for connection to said means for reading marks in said plurality of parallel columns;

the first input to said second plurality of AND gates connected to the output of said second plurality of OR gates, and the second input to said second plurality of AND gates adapted for connection to the means for reading the marks in said plurality of parallel columns;

said third input of said first and second plurality of AND gates adapted for connection to a source of signals for sequentially energizing said AND gates in a predetermined manner;

first OR gate means;

second OR gates means;

the output from said first plurality of AND gates connected to the inputs of said first OR gate means and the outputs of said second plurality of AND gates connected to the input of said second OR gate means;

means connected to the outputs of said first OR gate for totalizing the number of signals passed by said first OR gate means to obtain a representation of the correct answers to said examination.

4. Apparatus as claimed in claim 3 including:

third OR gate means connected to the outputs of said first and second OR gate means;

register means;

means connecting the output of said third OR gate means to said register means;

said register means having additional inputs for receiving signals representing the number of answers to said examination; and said register means comparing inputs representing the total number of questions in said examination and the total number of correct and incorrect answers and for generating an output signal when said two totals do not compare.

References Cited by the Examiner
UNITED STATES PATENTS

| | | | |
|---|---|---|---|
| 3,050,248 | 8/1962 | Lindquist | 35—48 |
| 3,212,203 | 10/1965 | Atkinson | 35—48 |
| 3,216,132 | 11/1965 | Flaherty et al. | 35—48 |

EUGENE R. CAPOZIO, *Primary Examiner.*

R. E. KLEIN, R. WEIG, *Assistant Examiners.*